(12) United States Patent
Adolphson et al.

(10) Patent No.: US 11,268,041 B2
(45) Date of Patent: Mar. 8, 2022

(54) METHODS OF IGNITING A FUEL SOURCE, LIGHTER FLUID COMPOSITIONS AND SELF-LIGHTING CHARCOAL BRIQUETTES

(71) Applicants: University of Georgia Research Foundation, Inc., Athens, GA (US); ESCOGO, LLC, Monroe, GA (US)

(72) Inventors: Ryan B. Adolphson, Athens, GA (US); Daniel P. Geller, Athens, GA (US); Levi T. Mills, Bogart, GA (US); Marcus Leonard Smith, Addison, TX (US); Fredrick W. Huszagh, II, Monroe, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 17/012,549

(22) Filed: Sep. 4, 2020

(65) Prior Publication Data

US 2020/0399551 A1    Dec. 24, 2020

Related U.S. Application Data

(62) Division of application No. 15/949,293, filed on Apr. 10, 2018, now Pat. No. 10,800,989.

(60) Provisional application No. 62/483,558, filed on Apr. 10, 2017, provisional application No. 62/505,212, filed on May 12, 2017.

(51) Int. Cl.
*C10L 5/26* (2006.01)
*C10L 5/34* (2006.01)
*C10L 1/02* (2006.01)
*C10L 11/04* (2006.01)
*F24B 15/00* (2006.01)
*A47J 37/07* (2006.01)
*F23Q 2/02* (2006.01)

(52) U.S. Cl.
CPC ............... *C10L 5/26* (2013.01); *A47J 37/079* (2013.01); *C10L 1/02* (2013.01); *C10L 5/34* (2013.01); *C10L 11/04* (2013.01); *F23Q 2/02* (2013.01); *F24B 15/005* (2013.01); *C10L 2200/0469* (2013.01); *C10L 2200/0476* (2013.01); *C10L 2230/06* (2013.01); *C10L 2290/08* (2013.01); *C10L 2290/22* (2013.01); *C10L 2290/24* (2013.01); *C10L 2290/542* (2013.01); *C10L 2290/543* (2013.01); *C10L 2290/547* (2013.01); *C10L 2290/548* (2013.01); *Y02E 50/10* (2013.01)

(58) Field of Classification Search
CPC ...... C10L 5/26; C10L 5/34; C10L 1/02; C10L 11/04; C10L 2230/06; C10L 2290/547; C10L 2290/542; C10L 2290/543; C10L 2290/24; C10L 2200/0469; C10L 2200/0476; F24B 15/005; A47J 37/079; F23Q 2/02; Y02E 50/10
See application file for complete search history.

(56) References Cited

U.S. PATENT DOCUMENTS 3,395,002 A * 7/1968 Winnicki ................ C10L 11/04
44/267
2016/0257899 A1* 9/2016 Parrott ....................... C10L 9/10

\* cited by examiner

*Primary Examiner* — Cephia D Toomer
(74) *Attorney, Agent, or Firm* — Thomas Horstemeyer, LLP

(57) ABSTRACT

The present application provides charcoal briquettes infused with a flammable composition including fusel oil and/or one or more dehydration products of fusel oil and the flammable compositions including one or more dehydration products of fusel oil.

14 Claims, 5 Drawing Sheets

FIG. 2

METHODS OF IGNITING A FUEL SOURCE, LIGHTER FLUID COMPOSITIONS AND SELF-LIGHTING CHARCOAL BRIQUETTES

CROSS-REFERENCE TO RELATED APPLICATIONS

This application is a divisional application of U.S. patent application titled "Methods of Igniting a Fuel Source, Lighter Fluid Compositions and Self-Lighting Charcoal Briquettes" having Ser. No. 15/949,293, filed on Apr. 10, 2018, which claims priority to U.S. provisional application titled "Lighter Fluid Compositions and Methods of Making" having Ser. No. 62/483,558, filed on Apr. 10, 2017, and U.S. provisional application titled "Lighter Fluid Compositions and Methods of Making" having Ser. No. 62/505,212, filed on May 12, 2017, all of which are entirely incorporated herein by reference

BACKGROUND

Fire starter fluids have applications in various markets, but many of the current products in these markets are made from petroleum, and have questionable environmental and human health outcomes, particularly when used on barbecue charcoal. For example, the current industry standard for charcoal lighter fluid is composed of a combination of naphtha and isoparaffinic hydrocarbons, both of which are products of petroleum refining. The fluid is applied to charcoal briquettes, and, after a brief waiting period, the briquettes can be ignited using a match or lighter. Likewise, match light charcoal uses a similar product as an accelerant, which usually contains a higher concentration of isoparaffinic hydrocarbons. Charcoal briquettes are soaked in the fluid and immediately packaged in a protective package to prevent evaporation of the accelerant. At the time of use, the briquettes are removed from the packaging and can be ignited using a match or lighter. Such products are reliable, but impart a petroleum odor and flavor to the foods that are cooked over charcoal ignited using the fluid.

Public interest has seen a recent increase in locally sourced, organic, and naturally based products, which has led to the creation of new markets for sustainably sourced, environmentally friendly, and healthier products for human consumption and environmental application. Likewise, a general movement away from petroleum based products has also been observed. These factors have led to the development of markets for renewable and natural products, especially in the areas of human health, food, and nutrition products. As the current industry standard, fire starters and other products derived from petroleum do not qualify as renewable or natural.

SUMMARY

Briefly described, the present disclosure provides methods of igniting a fuel source with a lighter fluid composition including fusel oil; self-lighting charcoal briquettes, flammable compositions, methods of making flammable compositions, and lighter devices.

In embodiments, the methods of igniting a fuel source include contacting a fuel source with a lighter fluid composition including a fusel oil component including a fusel oil, a derivative of fusel oil, or a combination of both, and igniting the lighter fluid composition. In embodiments the derivative of fusel oil is a dehydration product of fusel oil. In embodiments, the fusel oil component is 5-100% of the composition.

Embodiments of a self-lighting charcoal briquette according to the present disclosure include a charcoal briquette infused with a flammable composition, the flammable composition including: a fusel oil component consisting essentially of: fusel oil, a derivative of fusel oil, or a combination of both. In embodiments, the fusel oil component is about 5-100% of the flammable composition in the charcoal briquette.

Embodiments of flammable compositions of the present disclosure include a fusel oil component comprising: fusel oil, a derivative of fusel oil, or both, at about 5-99% of the composition and a biodiesel component comprising a combination of fatty-acid alkyl esters (FAAEs) at about 1-95% of the composition.

Embodiments of flammable compositions of the present disclosure include flammable compositions consisting of: a fusel oil component at about 5-99% of the composition, the fusel oil component consisting of: a fusel oil, a dehydration product of fusel oil, or a combination of both, the fusel oil component having about 0-30% native ethanol and having about 15% or less of water; and a biodiesel component at about 1-95% of the composition, wherein the biodiesel component consists of a combination of fatty-acid alkyl esters (FAAEs), the flammable composition having a flash point of about 38° C. or greater.

The present disclosure also includes methods of making a flammable liquid composition, such method including providing a fusel oil source comprising a multicomponent alcohol mixture and water; and removing at least a portion of water from the fusel oil to provide a fusel oil component having about 15% or less of water.

The present disclosure also provides lighter devices including fusel oil as a flammable composition in the lighter. In embodiments, lighter devices of the present disclosure include a reservoir containing a flammable composition, the flammable composition comprising: a fusel oil component consisting essentially of: fusel oil, a derivative of fusel oil, or a combination of both, at about 5-100% of the composition, wherein the composition has a flash point of about 38° C. or greater; a valve associated with the reservoir and movable between closed and open positions to allow or prevent a flow of the flammable composition out of the reservoir; and a flame source that, upon actuation by a user when the valve is in the open position, ignites the flammable composition flowing out of the reservoir to produce a flame.

Other systems, devices, compositions, methods, features, and advantages of the present disclosure will be or become apparent to one with skill in the art upon examination of the following drawings and detailed description. It is intended that all such additional systems, devices, compositions, methods, features, and advantages be included within this description, and be within the scope of the present disclosure.

BRIEF DESCRIPTION OF THE DRAWINGS

Further aspects of the present disclosure will be more readily appreciated with reference to the following drawings, which are discussed in the description and examples below. The components in the drawings are not necessarily to scale, emphasis instead being placed upon clearly illustrating the principles of the present disclosure.

FIG. 2 is a table describing properties of various lighter fluid compositions of the present disclosure including a blend of fusel oil/fusel oil derivatives, biodiesel, and ethanol in various percentages. The various compositions were applied to non-self-lighting briquettes and properties such as flame out time, reignition time, ready to cook time, and smoke out time were determined.

DESCRIPTION

Figure 1:
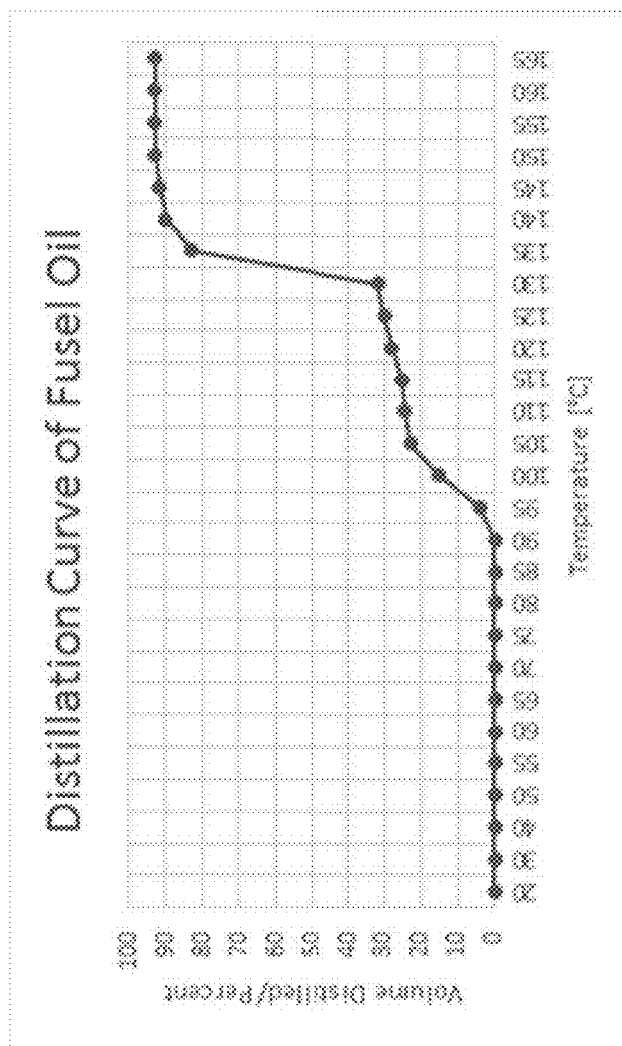
FIG. 1 is a graph illustrating a general distillation curve of a raw fusel oil and illustrating the identification of fractions A, B, and C, where fraction A is obtained between about room temperature and 105° C., fraction B is obtained between about 106 and 133° C., and fraction C is obtained at about 133° C. and above.

The details of some embodiments of the present disclosure are set forth in the description below. Other features, objects, and advantages of the present disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references, where noted, as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. Any terms not specifically defined within the instant application, including terms of art, are interpreted as would be understood by one of ordinary skill in the relevant art; thus, is not intended for any such terms to be defined by a lexicographical definition in any cited art, whether or not incorporated by reference herein, including but not limited to, published patents and patent applications. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, and the like, which are within the skill of the art. Such techniques are explained fully in the literature.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps. Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. patent law and the term is open-ended, allowing for the presence of more than that which is recited so long as basic or novel characteristics of that which is recited is not changed by the presence of more than that which is recited, but excludes prior art embodiments.

Prior to describing the various embodiments, the following definitions are provided and should be used unless otherwise indicated.

Definitions

In describing and claiming the disclosed subject matter, the following terminology will be used in accordance with the definitions set forth below.

As used in the present disclosure, the term "fusel oil" refers to a mixture of alcohols (medium-chain and short-chain alcohols), aldehydes, ketones, and other chemical species formed as a product of fermentation of sugars, often as a byproduct during of the fermentation process utilized in the production of fuel ethanol, beverage ethanol, as well as other industrial fermentation processes. Crude mixed alcohol (CMA) streams are common by-products in many industrial processes including fermentation and biofuel production and can be a source of crude fusel oil. These by-product streams are often composed of high-value medium-chain mixed alcohols along with other compounds including short-chain alcohols, volatile organic compounds (VOCs), and water. Some of the water and other VOCs and shorter chain alcohols can be removed by various processes, including various methods of dehydration. Fusel oil can include a mixture of short to medium-chain alcohols and other components that can be separated into various fractions and sub-mixtures, by various processes, such as, but not limited to distillation fractionation. In the present disclosure "derivatives of fusel oil" include compositions that result from separation of raw fusel oil (e.g., crude mixed alcohol (CMA)), by various processes of dehydration (water removal), including distillation or other methods. In some embodiments, derivatives of fusel oil include various distillation fractions obtained during distillation of raw fusel oil. Fusel oil can include many different alcohol components as well as other components such as ketones; thus, for purposes of illustration only, some of the components of fusel oil can include, but are not limited to, those listed in the tables 1 and 2 below.

TABLE 1

Non-limiting Example of Fusel Oil Composition and Properties of Components

| Fusel Oil Composition | Typical % in Fusel Oil | | Boiling Point [° C.] | Flash Point [° C.] |
|---|---|---|---|---|
| | Low [%] | High [%] | | |
| Ethanol | — | 10 | 78 | 8.9 |
| 1-Propanol | 2 | 7 | 97 | 15 |
| Isobutanol | 7 | 14 | 108 | 27.8 |
| Water | 10 | 17 | 100 | — |
| Active Amyl Alcohol (2-methylbutan-1-ol) and/or | 40 | 70 | 128 | 43.3 |
| Isoamyl Alcohol (3-methylbutan-1-ol) | | | 130-132 | 45.6 |
| High Boiling Fraction (Table 2) | — | 3 | See Table 2 | See Table 2 |

TABLE 2

Non-limiting Example of Fusel Oil High Boiling Fraction

| Chemical | Boiling Point [° C.] | Flash Point [° C.] |
|---|---|---|
| a-Ionone | 131 | 111.9 |
| iso- and active-Amyl alcohols | 132 | 44 |
| n-Amyl alcohol | 137 | 48.9 |
| n-Hexyl alcohol | 157 | 60 |
| Methyl amyl carbinol | 158 | 64 |
| Ethyl caproate | 167 | 49 |
| Methyl heptanone | 170 | 50.6 |
| Matsutake-ol | 170 | 61 |
| Hexyl acetate | 171 | 37 |
| Methyl hexyl ketone | 172 | 62.8 |
| Limonene and other terpene hydrocarbons | 175 | 42 |
| n-Heptyl alcohol | 175.8 | 73.9 |
| Benzaldehyde | 179 | 62 |
| Ethyl enanthate | 187 | 66 |
| Heptyl acetate | 193 | 68.6 |
| n-Octyl alcohol | 194 | 81 |
| Methyl heptyl ketone | 195 | 65.7 |
| Linalool | 195 | 85 |
| Aliphatic hydrocarbon (b.p. 200 | 200 | N/A |
| Aromatic hydrocarbon (b.p. 200° C.-) | 200 | N/A |
| Sesquiterpene hydrocarbons 0.45 | 200 | N/A |
| Methyl heptyl carbinol | 201 | 81 |
| Acetophenone | 202 | 80.9 |
| Camphor | 204 | 64.4 |
| Benzyl alcohol | 205 | 97 |
| Ethyl caprylate | 208.5 | 75 |
| Octyl acetate 0.36 | 210 | 86.1 |
| Nonyl acetate 0.62 | 210 | 91.3 |
| Ethyl benzoate | 212 | 88.9 |
| Borneol | 212 | 65 |
| n-Nonyl alcohol 1.02 | 213.37 | 97.8 |
| Naphthalene | 217 | 78.9 |
| Phenylethyl alcohol | 218 | 98 |
| Citronellol and other terpene alcohols 2.8 1 | 224.5 | 98 |
| Amyl caproate O. IO | 226 | 87.9 |
| Ethyl pelargonate 1.56 | 227 | 94 |
| Ethyl phenylacetate 0.37 | 227 | 98 |
| Phenylethyl acetate 3.32 | 232.6 | 101.7 |
| n-Decyl alcohol 0.46 | 232.9 | 101.7 |
| Phenylethyl propionate 1.09 | 238 | 107 |
| Ethyl caprate 40.94 | 241.5 | 102.2 |
| n-Undecyl alcohol 0.13 | 243 | 109 |
| Decyl acetate 0.35 | 244 | 101.3 |
| Ethyl and amyl laurate* 0.23 | 250 | N/A |
| Methyl heptyl carbinyl acetate 0.65 | 258 | 101 |
| Undecyl acetate 0.30 | 259.4 | 110.5 |
| Amyl caprylate 0.8 7 | 260.2 | 109.6 |
| Ethyl laurate 9.55 | 269 | 118.6 |
| Ethyl and amyl myristate* 1.61 | 280 | N/A |
| Ethyl and amyl palmitate* 15. IO | 280 | N/A |
| Amyl caprate 2.37 | 290 | 130 |
| Methyl tridecyl ketone 3.54 | 294 | 83.9 |
| Ethyl myristate 0.53 | 295 | 135 |
| Ethyl and amyl stearate* 6.12 | 350 | N/A |
| a-Methyl-a'-([j-furyl)-tetrahydrofuran | N/A | N/A |
| Unknown ketone 0.82 | N/A | N/A |
| Unknown alcohol 1.33 | N/A | N/A |

In the present disclosure, the term "biodiesel" refers to a non-petroleum based diesel fuel including a combination of fatty-acid alkyl esters (FAAEs). The FAAEs of the present disclosure can be derived from a variety of lipid sources including, but not limited to, animal fats, virgin vegetable oils, and cooking oils, such as used cooking oil (UCO) or various blends of these lipid sources and can include long-chain alkyl ester fatty acids, such as but not limited to methyl ester, ethyl ester, and propyl ester fatty acids.

As used in the present disclosure, the term "native ethanol" refers to ethanol present in fusel oil (e.g., crude fusel oil or a fusel oil derivative, such as a dehydration product), as opposed to ethanol added to a composition of the present disclosure, which may be referred to herein as an "ethanol component".

DESCRIPTION

Embodiments of the present disclosure encompass methods of igniting a fuel source using fusel oil and/or derivative of fusel oil; flammable fluid compositions, such as a lighter fluid, including fusel oil and/or derivatives of fusel oil and optionally including a biodiesel component of fatty-acid alkyl esters (FAAEs), and optionally ethanol; charcoal briquettes infused with fusel oil; methods of making fusel-oil based flammable compositions, and devices including fusel-oil based flammable compositions. The present disclosure also includes methods of making and using the flammable compositions of the present disclosure. The FAAEs and the fusel oil derivatives of the compositions are obtained from renewable and eco-friendly sources, as described in greater detail below. The compositions and methods of the present disclosure do not need, and in embodiments, do not contain, any petroleum products. Thus, in embodiments, the compositions and products of the present disclosure are petroleum-free.

The compositions of the present disclosure are flammable compositions, which can be used as lighter fluid and/or other accelerant, and other products used for igniting and/or increasing flammability of a fuel source. Biodiesel and ethanol or butanol mixtures have been used as petroleum-free lighter fluids, such as described in U.S. Pat. No. 8,728,178 and US Pub. No. 20110269654; however, ethanol is highly volatile and butanol is not economical due to an expensive production process. Fusel oil is a readily available, low-cost byproduct of other processes (including ethanol fermentation), and fusel oil has not been previously used as an accelerant for igniting fuel sources, in lighter fluids, self-lighting charcoal briquettes, or other fire starter fluids, materials, or devices.

The methods, flammable compositions, products, and devices of the present disclosure are based in part on the use of fusel oil and components/derivatives of fusel oil. As described above, fusel oil is considered a low-value byproduct of fermentation (e.g., ethanol fermentation) that produces crude mixed alcohol (CMA) streams. These by-product streams contain high-value medium-chain flammable organic compounds (including, but not limited to those listed in tables 1 and 2 above) produced during the fermentation of sugars by yeast as well as other compounds including short-chain alcohols, volatile organic compounds (VOCs), and, sometimes, water. Depending on the process of which the crude fusel oil is a byproduct, the water content of these mixtures can make them unsuitable as a component in flammable products such as fire starter formulations, lighter fluids, and fuel substitutes. Likewise, the presence of the short-chain alcohols and other VOCs can render some of the crude by-product fusel oils unsuitable for applications in products that need to meet both South Coast Air Quality Management District (SCAQMD) and California Air Resources Board (CARB) guidelines. The SCAQMD has defined the Rule 1174 guidelines that requires all certified products to emit no more than 0.020 pound of volatile organic compounds (VOC) per start resulting from a single barbecue charcoal ignition. All products used for the ignition of barbecue charcoal—other than electric starters (probes), chimneys using paper tinder, natural gas, or propane—require testing and are subject to compliance to Rule 1174 and the 0.020 pound per start emission threshold for volatile organic compounds (VOC) before they can be offered for sale within the SCAQMD jurisdiction. SCAQMD requires that an independent testing laboratory, approved by the District, conduct the testing and prepare a report of the findings.

Fusel oil and its derivatives described in the present disclosure include a multicomponent mixture of alcohols and other small organic molecules, which can be separated from any water present in the raw fusel oil by dehydration. In embodiments, some, most, or all of the water can be removed, and the remaining dehydration product fusel oil derivative, a multicomponent mixture of alcohols and other components, can be used as is or further separated into sub-mixtures by additional chemical treatment, mechanical filtration, or distillation of the fusel oil, as described in greater detail below. Since the fusel oil can be obtained from the fermentation of sugars, such as in ethanol production (including fuel ethanol, industrial ethanol or beverage ethanol), it is environmentally benign and based on renewable substances.

Although fusel oil is known to be flammable, the present disclosure demonstrates the surprising discovery that fusel oil has more desirable properties than commercially available lighter fluid compositions and accelerants, such as petroleum based lighter fluids, biodiesel-based lighter fluids, and the like. The present disclosure also demonstrates the unexpected finding that fusel oil in a lighter fluid composition is more effective in lighting charcoal briquettes than embodiments consisting of ethanol and biodiesel. Removal of some, most, or all residual water that may be present in the raw fusel oil (from the fermentation, processing stream, etc.) can further refine the fusel oil and improve flammability and reduce the volatility of the fusel oil to make it more consistent and burn more uniformly. As demonstrated in the Examples below, fusel oil, fusel oil derivatives, and other compositions of the present disclosure provide excellent flammability, with a flash point exceeding relevant safety standards while also being capable of overcoming undesirable features of petroleum-based flammable compositions. Thus, the present disclosure includes methods of igniting a fuel source (e.g. wood, other wood-based materials, charcoal, paper, biomass, or any other flammable/combustible material) by contacting the fuel source with a flammable composition/lighter fluid composition including fusel oil and then igniting the lighter fluid composition to, in turn, ignite and burn the fuel source. In methods of the present disclosure for igniting a fuel source, the lighter fluid composition includes a fusel oil component, and the fusel oil component comprises fusel oil, a derivative of fusel oil, or a combination of both.

In embodiments of the methods and compositions of the present disclosure, the fusel oil is a byproduct of alcohol production via fermentation and includes a multicomponent alcohol mixture. In embodiments, the derivative of fusel oil includes dehydration products of fusel oil, where some, most or all water is removed from crude fusel oil. The dehydration products include a multicomponent alcohol mixture and, in embodiments, can be produced by a dehydration method such as, but not limited to: chemical treatment, mechanical filtration, distillation, and a combinations of these methods. In embodiments, after dehydration treatment, the fusel oil derivative includes less than about 15% of water; in embodiments, it includes less than 10%, less than about 5%, less than about 3%, and so on. For optimal burning performance, in embodiments the compositions have less than about 15% of water. In embodiments, the flammable compositions/ slighter fluid compositions comprises 15% or less of water, 10% or less, 5% or less, and so on.

In embodiments of the methods, compositions, products, and devices of the present disclosure, the fusel oil component can make up about 5-100% of the composition. In embodiments, the fusel oil component makes up 100% of the composition, or the composition consists essentially of or consists of the fusel oil component.

In some embodiments of the present disclosure, flammable compositions/lighter fluids, and other products/compositions of the present disclosure also include a biodiesel component including FAAEs. Like fusel oil, FAAEs of the flammable compositions of the present disclosure can be obtained from renewable lipid sources, such as vegetable oils, used cooking oil, etc. In embodiments the biodiesel component is derived from a non-petroleum lipid source. In embodiments, the non-petroleum lipid source can include, but is not limited to: animal fats, virgin vegetable oils, used cooking oil, brown grease, and combinations of these. The FAAEs of the present disclosure can include, but are not limited to, methyl-, ethyl-, and/or propyl-ester fatty acids, or a combination thereof. In embodiments, the FAAEs are methyl ester fatty acids. In embodiments, the biodiesel component makes up about 1-95% of the composition.

In embodiments, compositions, products, etc. of the present disclosure also include an optional ethanol component making up 0 to about 30% of the composition. While fusel oil can include native ethanol (present naturally in the fusel oil and/or fusel oil derivative), the flammable compositions of the present disclosure can also include an added ethanol component (added to the fusel oil component and any biodiesel component). In embodiments, compositions of the present disclosure can optionally include added ethanol up to about 30% of the composition. In embodiments, the combination of native ethanol and added ethanol in compositions of the present disclosure, combines to a total ethanol content of 30% or less of the composition.

Products with the flammable compositions of the present disclosure can be used in methods of igniting a fuel source and/or in a variety of applications including charcoal lighter fluid, campfire starter, and an accelerant for instant light ("self-lighting") charcoal briquettes. In embodiments, the compositions described in the present disclosure are based on renewable products and will have a volatile organic compound (VOC) emission in conformance to South Coast Air Quality Management District (SCAMD) and California Air Resources Board (CARB) guidelines.

As described briefly above, in embodiments, the flammable compositions of the present disclosure include a fusel oil component and can optionally include an added ethanol component and/or a biodiesel component (which includes the FAAEs). In embodiments, the fusel oil component includes fusel oil, a derivative of fusel oil, or both, and makes up about 5-100% of the composition; the optional ethanol component includes added ethanol and makes up about 0-30% by volume of the composition; and the optional biodiesel component includes a combination of FAAEs and makes up about 0-95% of the composition. In other embodiments, the flammable composition includes a fusel oil component including fusel oil, a derivative of fusel oil, or both, and makes up about 5-100% of the composition and a biodiesel component including a combination of FAAEs that makes up about 1-95% of the composition. Such embodiments may also include an optional ethanol component at about 0-30% of the composition. In other embodiments, the flammable compositions of the present disclosure include a biodiesel component making up about 1-80% of the composition and a fusel oil component making up about 20%-99% of the composition. In embodiments, the composition includes about 50% fusel oil component and about 50% biodiesel component. Other percent combinations of fusel oil component/biodiesel component are also intended to be included in the scope of the present disclosure, such as 90/10, 75/25, 60/40, 40/60, 25/75, 10/90, and so forth, including any intermediate ranges.

As discussed above, the fusel oil component can include fusel oil (e.g., unfractionated, raw fusel oil) or derivatives of fusel oil, such as, but not limited to various dehydration products, separation products or distillation fractions of fusel oil. In embodiments the fusel oil is a mixture of short to medium-chain organic chemicals produced by fermentation of sugars produced during the ethanol fermentation process utilized in the production of fuel ethanol, beverage ethanol, and/or other industrial processes. Many of the components of this fusel oil exhibit excellent flammability and low VOC emissions. In embodiments, the fusel oil component includes 15% or less of water. In embodiments, the fusel oil includes 10% or less of water. In other embodiments, the fusel oil includes 5% or less of water. Likewise, embodiments of the compositions of the present disclosure can include 15% or less, 10% or less, and 5% or less of water. Water can be removed by various dehydration processes, including distillation, chemical dehydration (loss of water molecule from one compound by mixture with another compound), and physical separation methods, as well as combinations of these methods.

Tables 1 and 2 above include a non-exhaustive list of possible components of fusel oil, which is a mixture of components, including a multicomponent alcohol mixture. The flammable components of fusel oil have variable flash points, which influences the overall flash point of the fusel oil component and lighter fluid composition as a whole. In embodiments, the compositions of the present disclosure have a flash point above 38° C., which exceeds the DOT threshold according to 49 CFR 173.20. Compositions with flash points below this threshold are subject to hazmat provisions. In embodiments, the increasing flash points of the components present in the fusel oil provides step-wise ignition of the fluid components resulting in consistent ignition of the target material, such as a fuel source. The ignition process will start with the low flash point of short-chain organic molecules which will ignite first, leading to temperatures sufficient to ignite larger molecules, ultimately ending with the ignition of high flash point FAAEs, which make up the largest percent component in the compositions of the present disclosure and which are capable of reaching combustion temperatures sufficient to facilitate ignition of the target materials such as charcoal or biomass.

In some embodiments of the present disclosure, the fusel oil component of the present disclosure is raw, unfractionated fusel oil including a wide range of components. In other embodiments, the fusel oil component of the present disclosure includes a dehydration product of fusel oil, where water has been removed from the fusel oil by various methods. In embodiments, water can be removed from fusel oil by distillation. In embodiments, other components of fusel oil can be separated (e.g., fractionated) by continued distillation. Distillation can allow fusel oil to be fractionated in to various multicomponent alcohol mixtures. For instance, in the distillation process, ethanol distills out early in the process, then water, then other alcohols. Thus, at various stages the distillate can be collected to achieve different fractions. These different fractions can be used separately as the fusel oil component of the compositions of the present disclosure, or combined with other fractions and/or raw fusel oil as the fusel oil component.

In embodiments, the distillation fractions may include but are not limited to fractions A, B and C. In embodiments, fraction A is obtained between room temperature and about 105° C. Distillation fraction A can include alcohols such as, but not limited to, ethanol, propanol, and water. In embodiments, distillation fraction B is obtained between about 106 and 133° C. and can include lower-chain alcohols such as, but not limited to butanol, 3-methyl-1-butanol (isoamyl alcohol), and 2-methyl-1-butanol (active amyl alcohol). In embodiments, distillation fraction C is obtained at about 133° C. and above, and can include alcohols such as, but not limited to amyl alcohols, hexanol, and octanol and their isomers including, but not limited to the chemicals listed in Table 2 above. In embodiments, the fusel oil component of the compositions of the present disclosure can include distillation fractions A, B, and C, or combinations of one or more of those fractions. In addition, the fractions may be combined with other components (e.g., biodiesel components, added ethanol component, etc.), with raw fusel oil, or both. If distillation is used to remove water from raw fusel oil to provide the fusel oil component, ethanol will also be removed, since ethanol is removed at a lower temperature than water. In some embodiments, ethanol can be optionally added back into the composition, by adding ethanol in to the composition of the present disclosure to provide 0-20% of the composition. However, in some embodiments, alternate dehydration processes are used to remove water from fusel oil, while leaving native ethanol present in the fusel oil component.

Embodiments of the present disclosure include flammable compositions having the percentages of fusel oil and optionally biodiesel as described above. In embodiments, a flammable composition of the present disclosure can, include: a fusel oil component including fusel oil, a derivative of fusel oil, or both, at about 5-99% of the composition and a biodiesel component including a combination of fatty-acid alkyl esters (FAAEs) at about 1-95% of the composition. In embodiments, the flammable composition of the present disclosure consists of: a fusel oil component at about 5-99% of the composition and a biodiesel component at about 1-95% of the composition, where the flammable composition has a flash point of about 38° C. or greater. In such embodiments, the fusel oil component consists of: a fusel oil, a dehydration product of fusel oil, or a combination of both, and the fusel oil component has about 0-30% native ethanol and having about 15% or less of water. The biodiesel component, at about 1-95% of the composition, consists of a combination of fatty-acid alkyl esters (FAAEs).

The various formulations of the compositions of the present disclosure described above can be used in various methods for igniting target materials. In embodiments, the flammable compositions or lighter fluid of the present disclosure can be deposited on (contacted with) a target material, such as but not limited to, a fuel source. Then the flammable compositions are ignited, which achieves stepwise ignition of the components of the composition as flash point temperatures for various components are reached, culminating in the ignition of the target materials. In embodiments, the target material is charcoal, and in other embodiments, the target material is biomass, wood-based materials, and the like, or combinations of such flammable materials. In embodiments, the flammable composition of the present disclosure is a lighter fluid/accelerant. In other embodiments, the composition is a drip torch fuel. In embodiments, the flammable composition is a lighter fluid, the target material is charcoal or other fuel source, and the fuel source is soaked in the fire starter until saturation and subsequently packaged in evaporation proof packaging to provide pre-soaked charcoal. In other embodiments, the flammable composition may be applied to a fuel source such as wood or other target materials to be ignited, such as in a campfire.

Embodiments of the present disclosure also include products including the lighter fluid compositions of the present disclosure. Embodiments include "self-lighting" charcoal briquettes infused with the flammable compositions (e.g., lighter fluid compositions) of the present disclosure. In embodiments, self-lighting charcoal briquettes of the present disclosure include charcoal briquettes infused with a flammable composition, the flammable composition including a fusel oil component consisting essentially of: fusel oil, a derivative of fusel oil, or a combination of both. In embodiments, the self-lighting charcoal briquette of the disclosure include a fusel oil component including about 5-100% of the flammable composition. In embodiments, the composition has a flash point of about 38° C. or greater. In further embodiments, the flammable composition further comprises a biodiesel component comprising a combination of fatty-acid alkyl esters (FAAEs) at about 1-95% of the composition.

Embodiments of the present disclosure also include products including the flammable compositions of the present disclosure, such as lighters, tiki torches, lamps, and other flame-producing/flame bearing articles. Embodiments of the present disclosure include any flame-producing/bearing devices including a flammable composition including fusel oil or a derivative of fusel oil as the part of the flammable composition. Embodiments, include any such devices including a reservoir containing a flammable composition that includes a fusel oil component consisting essentially of: fusel oil, a derivative of fusel oil, or a combination of both. In embodiments the fusel oil component is about 5-100% of the composition. In further embodiments, the flammable composition further comprises a biodiesel component comprising a combination of fatty-acid alkyl esters (FAAEs) at about 1-95% of the composition. In embodiments, the flammable composition can also include added ethanol up to about 30% of the composition. In embodiments of such devices, the flammable composition has a flash point of about 38° C. or greater.

Embodiments of the present disclosure also include a lighter device (e.g., hand-held lighter, lighter-wand, re-fillable lighter, etc.) using the flammable composition including fusel oil. In embodiments of a lighter device of the present disclosure, the device includes a reservoir for containing the flammable composition, including a fusel oil component; a valve associated with the reservoir and movable between closed and open positions to allow or prevent a flow of the flammable composition out of the reservoir; and a flame source that, upon actuation by a user when the valve is in the open position, ignites the flammable composition flowing out of the reservoir to produce a flame.

Embodiments of the present disclosure also include methods regarding how to make the flammable compositions of the present disclosure. Methods of making the flammable liquid of the present disclosure include various methods of obtaining fusel oil and/or preparing and/or processing a crude fusel oil to produce a fusel oil derivative. In embodiments, a fusel oil derivative is prepared by providing a fusel oil source that has a multicomponent alcohol mixture and water. In embodiments the fusel oil is further processed (e.g., by dehydration) to provide a dehydration product of fusel oil. In other words, in embodiments, the fusel oil is provided from a source that includes water in the raw fusel oil. In embodiments, the method further includes removing at least a portion of the water from the fusel oil to provide a fusel oil component having about 15% or less of water. In embodiments, it contains about 10% or less, 5% or less, and so on. In embodiments, the method of removing water from the fusel oil component includes, but is not limited to, distilling the fusel oil to separate one or more fractions containing water; mechanical filtration dehydration using molecular sieve membrane systems; and chemical dehydration and separation (e.g., a chemical reaction involving the loss of a water molecule from the reacting molecule by mixing of one or more chemicals). Other embodiments of methods of making flammable compositions of the present disclosure also include combining the fusel oil component with a combination of FAAEs to provide a composition, where the fusel oil component is about 5-99% of the composition and the FAAEs are about 1-95% of the composition. In embodiments, the methods of making can also optionally include adding ethanol such that ethanol comprises 0-30% of the composition.

Additional details regarding the methods and systems of the present disclosure are provided in the Examples below. The specific examples below are to be construed as merely illustrative, and not limitative of the remainder of the disclosure in any way whatsoever. Without further elaboration, it is believed that one skilled in the art can, based on the description herein, utilize the present disclosure to its fullest extent.

It should be emphasized that the embodiments of the present disclosure, particularly, any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following embodiments.

The following examples are put forth so as to provide those of ordinary skill in the art with a complete disclosure and description of how to perform the methods and use the compositions and compounds disclosed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value.

EXAMPLES

Now having described the embodiments of the present disclosure, in general, the Examples below describe some additional embodiments of the present disclosure. While embodiments of the present disclosure are described in connection with the Examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

In this example, raw fusel oil obtained from Archer Daniels Midland (ADM) was fractionally distilled. The first distillation fraction (A) was collected from room temperature to 105° C. removing water, ethanol and other volatile organic compounds. In an example, fraction A was not included in the final product. The second distillation fraction (B) was collected between 106-133° C. This fraction contains amyl alcohol, iso-amyl alcohol and other desirable components. This fraction was included in the final product at 20% by volume. After this fraction was collected, distillation was terminated. In this example, the final undistilled fraction (C) was not used in the final product. The distillation curve is illustrated in FIG. 1.

A final fusel oil product was created by combining 20% by volume fraction B from the distillation above with 60% FAAEs derived from used cooking oil and 20% ethanol.

Example 2

In another embodiment, raw fusel oil obtained from Archer Daniels Midland (ADM) is fractionally distilled. The first distillation fraction (A) is collected from room temperature to 100° C. removing water, ethanol and other volatile organic compounds. This fraction is not included in the final product. Distillation is terminated at this point and the retentate, comprising fractions B and C as described above, is collected. This fraction is included in the final product at 15% by volume.

The final product is created by combining 15% by volume retentate (fractions B and C) from the distillation above with 35% FAAEs derived from used cooking oil, 30% FAAEs derived from beef tallow and 20% ethanol.

Example 3

In one embodiment, raw fusel oil obtained from Archer Daniels Midland (ADM) is fractionally distilled. The first distillation fraction (A) is collected from room temperature to 105° C. removing water, ethanol and other volatile organic compounds. This fraction is not included in the final product. The second distillation fraction (B) is collected between 106-133° C. This fraction contains amyl alcohol, iso-amyl alcohol and other desirable components. This fraction is included in the final product at 85% by volume. After this fraction is collected, distillation is terminated. In this example the final undistilled fraction (C) is not used in the final product. This distillation curve is illustrated in FIG. 1, below.

The final product is created by combining 85% by volume fraction B from the distillation above with 15% FAAEs derived from used cooking oil and 0% ethanol.

Example 4

In another embodiment, raw fusel oil obtained from Archer Daniels Midland (ADM) is fractionally distilled. The first distillation fraction (A) is collected from room temperature to 100° C. removing water, ethanol and other volatile organic compounds. This fraction is not included in the final product. Distillation is terminated at this point and the retentate, comprising fractions (B) and (C) as described above, is collected. These fractions are included in the final product at 70% by volume.

The final product is created by combining 70% by volume retentate (fractions B and C) from the distillation above with 30% FAAEs derived from used cooking oil, and 0% ethanol.

Example 5

Figure 2:
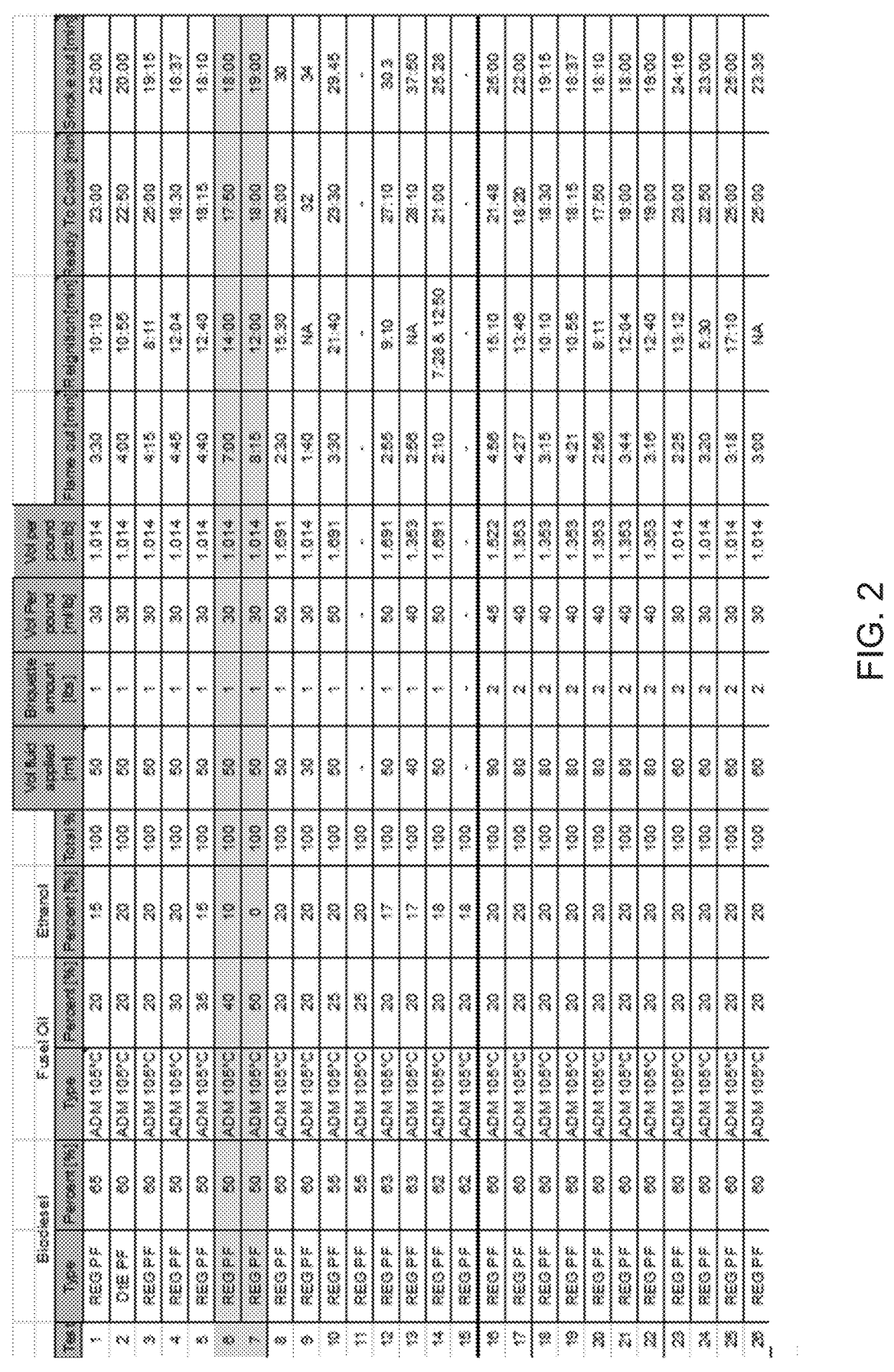

In this example a liquid comprised of different percentages of dehydrated fusel at <2% moisture content and different percentages of biodiesel and ethanol where blended, and the efficacy of the flame, smoke, and ready to cook time were monitored to determine the effectiveness of the different blends. The blends were applied to non-self-igniting charcoal briquettes. Details are provided in the table in FIG. 2. Flame out time indicates the amount of time from ignition until it extinguishes by itself. Re-ignition time is the time until the charcoal pile re-ignites once the correct temperature reaches the outer/bottom briquettes that did not get significant flame contact during first ignition. Ready to cook time indicates the amount of time for the charcoal to reach about 70% ash-over, comparative to the rule 1174 protocol; this is the time when the charcoal reaches the look and feel (indicating proper temperature) that a consumer would spread out the coals to begin cooking (in the tests, at this point the charcoal was spread out). The smoke out time is the time at which smoke has stopped coming off the briquettes or is at an insignificant amount.

Example 6

Figure 3:
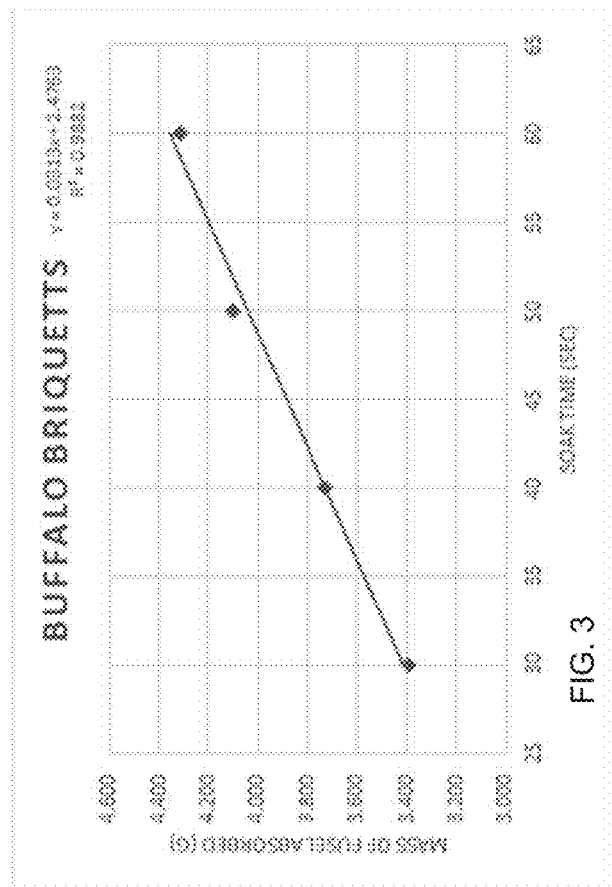
FIG. 3 is a graph illustrating the mass absorption by ESCOGO Buffalo Charcoal™ briquettes of an embodiment of flammable composition of the present disclosure having 95% fusel and 5% biodiesel.
Figure 4:
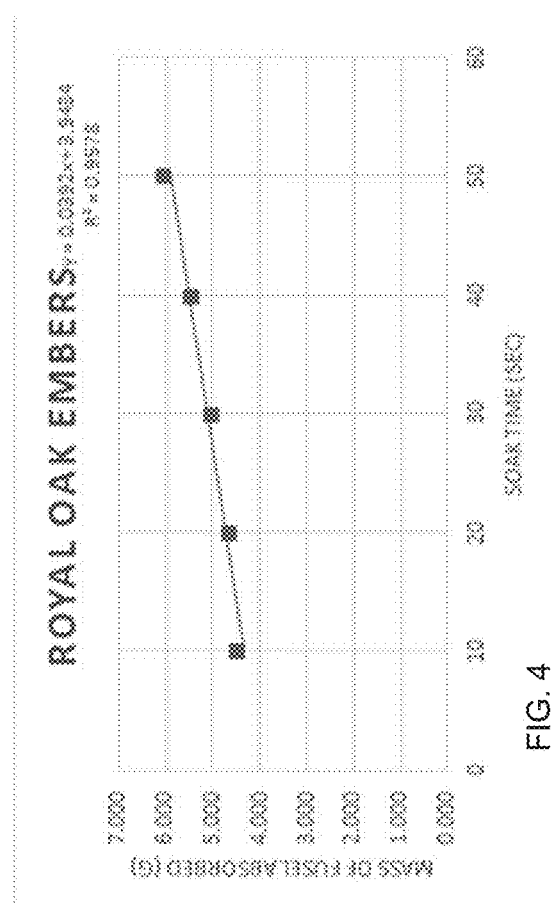
FIG. 4 is a graph illustrating the mass absorption by Royal Oak® Embers charcoal briquettes of an embodiment of flammable composition of the present disclosure having 95% fusel and 5% biodiesel.
Figure 5:
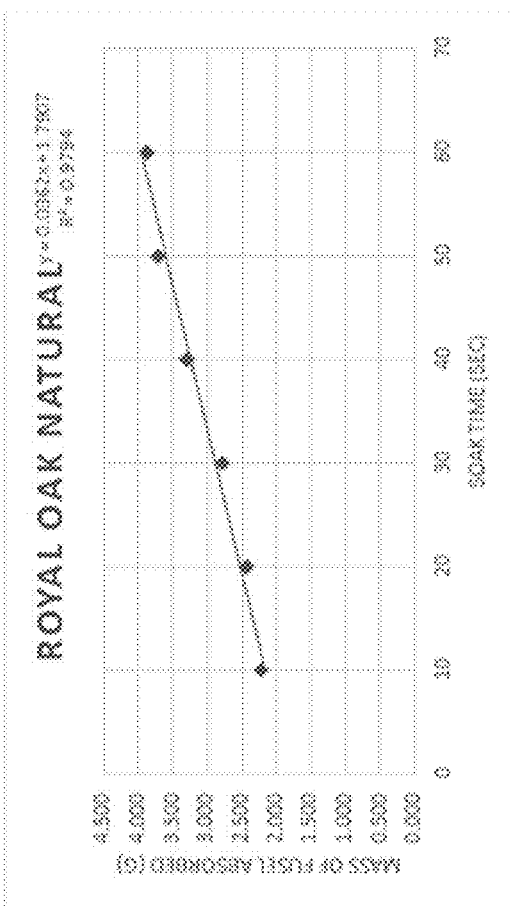
FIG. 5 is a graph illustrating the mass absorption by Royal Oak® Natural charcoal briquettes of an embodiment of flammable composition of the present disclosure having 95% fusel and 5% biodiesel.

This example describes preparation of charcoal briquettes infused with a flammable liquid including 95% chemically dehydrated fusel at <2% moisture content and 5% biodiesel and the performance of these briquettes. Charcoal briquettes were obtained from ESCOGO and Royal Oak®. Briquettes were dipped in increments ranging from 10-60 seconds as listed in Tables 3-5, dried for 2 minutes and then lit after 30 min of drying time. Mass absorption was measured in grams and lighting efficacy was also determined. Results are presented in Tables 2-4 below and FIGS. 3-5. Tables 3-5 and FIGS. 3-5 illustrate mass absorption for ESCOGO Buffalo Charcoal™, Royal Oak® Embers Charcoal, and Royal Oak® Natural Charcoal, respectively.

Results of the testing indicated that for the ESCOGO Buffalo Charcoal™ the most effective dip time was at least about 50 seconds, the average fusel mass was about 4.102 g, and the density was about 1.08 g/ml. Although charcoal with a 40 second dip time was able to light, the flame produced was much weaker. For the Royal Oak® Natural charcoal, the minimum effective dip time was about 10 seconds, average fusel mass was 2.225 g and density was less than about 1.00 g/ml. It is also noted that the average briquette size of the Royal Oak® Natural was about 10 g less than the other types tested. For the Royal Oak® Embers, the minimum effective dip time was also about 10 seconds, with an average fusel mass of 4.485 g and density of about 1.05 g/ml. This charcoal was the most inconsistent, exhibiting large cracks and unsealed briquettes.

TABLE 3

Fuel loading for Buffalo Briquettes

| Dip Time (sec) | Initial Mass | Final Mass | Fusel Mass | Loading % | Average Fusel | Burn (y/n) |
|---|---|---|---|---|---|---|
| 60 | 33.284 | 36.942 | 3.658 | 10.990% | 4.313 | Y |
| 60 | 34.789 | 38.685 | 3.896 | 11.199% | | |
| 60 | 36.178 | 41.564 | 5.386 | 14.888% | | |
| 50 | 36.029 | 41.492 | 5.463 | 15.163% | 4.102 | Y |
| 50 | 35.272 | 38.289 | 3.017 | 8.554% | | |
| 50 | 36.492 | 40.319 | 3.827 | 10.487% | | |
| 40 | 35.543 | 38.828 | 3.285 | 9.242% | 3.729 | Y (slower burn at start) |
| 40 | 33.672 | 37.473 | 3.801 | 11.288% | | |
| 40 | 35.43 | 39.532 | 4.102 | 11.578% | | |
| 30 | 36.584 | 40.273 | 3.689 | 10.084% | 3.394 | N (weak light) |
| 30 | 35.173 | 39.069 | 3.896 | 11.077% | | |
| 30 | 33.605 | 36.203 | 2.598 | 7.731% | | |

TABLE 4

Fuel loading for Royal Oak ® Embers Briquettes

| Dip Time (sec) | Initial Mass | Final Mass | Fusel Mass | Loading % | Av. Fusel | Burn (y/n) |
|---|---|---|---|---|---|---|
| 50 | 29.674 | 35.554 | 5.88 | 19.815% | 6.032 | y |
| 50 | 35.586 | 41.844 | 6.258 | 17.586% | | |
| 50 | 29.443 | 35.402 | 5.959 | 20.239% | | |
| 40 | 31.246 | 37.057 | 5.811 | 18.598% | 5.451 | y |
| 40 | 30.064 | 35.414 | 5.35 | 17.795% | | |
| 40 | 28.289 | 33.48 | 5.191 | 18.350% | | |
| 30 | 28.129 | 33.09 | 4.961 | 17.637% | 4.996 | y |
| 30 | 32.056 | 37.391 | 5.335 | 16.643% | | |
| 30 | 31.592 | 36.285 | 4.693 | 14.855% | | |
| 20 | 29.79 | 34.383 | 4.593 | 15.418% | 4.628 | y |
| 20 | 29.508 | 34.438 | 4.93 | 16.707% | | |
| 20 | 28.385 | 32.747 | 4.362 | 15.367% | | |
| 10 | 30.314 | 35.023 | 4.709 | 15.534% | 4.485 | y |
| 10 | 31.682 | 36.188 | 4.506 | 14.223% | | |
| 10 | 23.678 | 27.918 | 4.24 | 17.907% | | |

TABLE 5

Fuel loading for Royal Oak ® Natural Briquettes

| Dip Time (sec) | Initial Mass | Final Mass | Fusel Mass | Loading % | Average Fusel | Burn (y/n) |
|---|---|---|---|---|---|---|
| 60 | 20.532 | 24.345 | 3.813 | 18.571% | 3.879 | Y |
| 60 | 20.790 | 24.722 | 3.932 | 18.913% | | |
| 60 | 21.290 | 25.183 | 3.893 | 18.286% | | |
| 50 | 21.264 | 25.207 | 3.943 | 18.543% | 3.728 | Y |
| 50 | 21.016 | 25.396 | 4.380 | 20.841% | | |
| 50 | 19.735 | 22.595 | 2.860 | 14.492% | | |
| 40 | 21.471 | 24.308 | 2.837 | 13.213% | 3.302 | Y |
| 40 | 21.263 | 25.217 | 3.954 | 18.596% | | |
| 40 | 20.847 | 23.961 | 3.114 | 14.937% | | |
| 30 | 19.566 | 22.143 | 2.577 | 13.171% | 2.776 | Y |
| 30 | 20.064 | 22.797 | 2.733 | 13.621% | | |
| 30 | 19.193 | 22.212 | 3.019 | 15.730% | | |
| 20 | 20.911 | 23.434 | 2.523 | 12.065% | 2.437 | Y |
| 20 | 20.004 | 22.392 | 2.388 | 11.938% | | |
| 20 | 19.715 | 22.115 | 2.400 | 12.173% | | |
| 10 | 20.488 | 22.524 | 2.036 | 9.938% | 2.225 | Y |
| 10 | 20.476 | 22.848 | 2.372 | 11.584% | | |
| 10 | 20.861 | 23.127 | 2.266 | 10.862% | | |

Example 7

Figure 6:
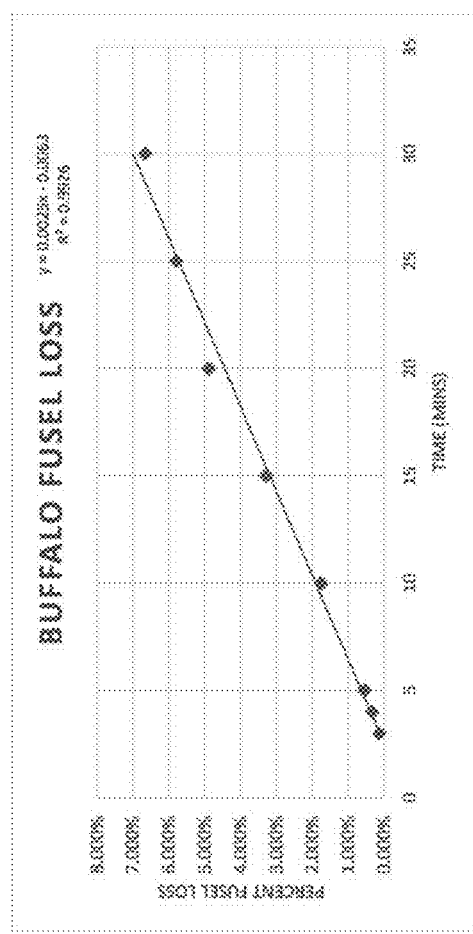
FIG. 6 is a graph illustrating the mass loss of impregnated fluid (95% fusel and 5% biodiesel) over time prior to bagging from ESCOGO Buffalo Charcoal™ briquettes.
Figure 7:
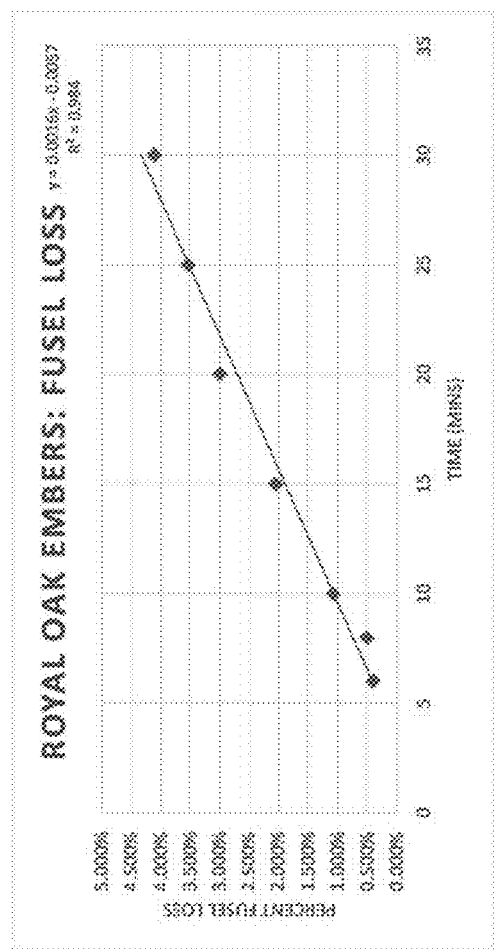
FIG. 7 is a graph illustrating the mass loss of impregnated fluid (95% fusel and 5% biodiesel) over time prior to bagging from Royal Oak® Embers charcoal briquettes.
Figure 8:
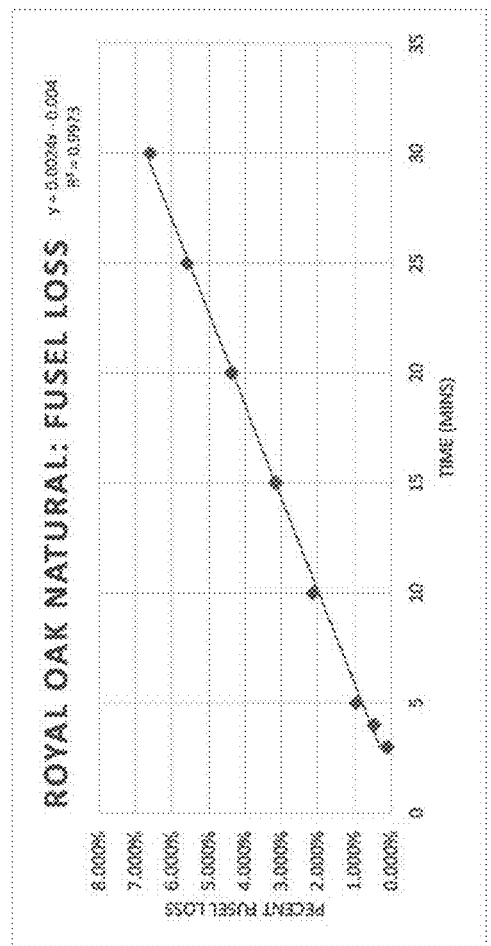
FIG. 8 is a graph illustrating the mass loss of impregnated fluid (95% fusel and 5% biodiesel) over time prior to bagging from Royal Oak® Natural charcoal briquettes.

This example quantifies the evaporation of the impregnated fluid from the charcoal in Example 6 and the requirement for bagging within a certain amount of time. The lighter fluid formula used is the same as described above for Example 6. The briquettes were prepared by dipping the charcoal in the fluid for 2 minutes (soak time) before testing, then dipped briquettes were allowed to sit for different amounts of time before bagging to determine the average loss of fusel oil over time, to determine optimal bagging times. Charcoal briquettes were obtained, as above, from ESCOGO and Royal Oak®. Mass evaporation was measured in grams. Results are presented in Tables 6-8 below and FIGS. 6-8. Tables 6-8 and FIGS. 6-8 illustrate mass loss of impregnated fluid from ESCOGO Buffalo Charcoal™, Royal Oak® Embers Charcoal, and Royal Oak® Natural Charcoal, respectively.

TABLE 6

Fuel loss over time for ESCOGO Buffalo Briquettes

| Time (mins) | Mass 1 | Mass Fusel | Mass 2 | Mass Fusel | Mass 3 | Mass Fusel | Average Fusel | % Loss |
|---|---|---|---|---|---|---|---|---|
| initial | 36.397 |  | 32.561 |  | 32.451 |  |  |  |
| 2 | 41.233 | 4.836 | 36.963 | 4.402 | 35.847 | 3.396 | 4.211 |  |
| 3 | 41.228 | 4.831 | 36.954 | 4.393 | 35.843 | 3.392 | 4.205 | 0.142% |
| 4 | 41.224 | 4.827 | 36.945 | 4.384 | 35.832 | 3.381 | 4.197 | 0.332% |
| 5 | 41.217 | 4.820 | 36.933 | 4.372 | 35.823 | 3.372 | 4.188 | 0.554% |
| 10 | 41.158 | 4.761 | 36.876 | 4.315 | 35.788 | 3.337 | 4.138 | 1.749% |
| 15 | 41.120 | 4.723 | 36.811 | 4.250 | 35.697 | 3.246 | 4.073 | 3.285% |
| 20 | 41.027 | 4.630 | 36.739 | 4.178 | 35.659 | 3.208 | 4.005 | 4.892% |
| 25 | 40.986 | 4.589 | 36.708 | 4.147 | 35.616 | 3.165 | 3.967 | 5.802% |
| 30 | 40.934 | 4.537 | 36.681 | 4.120 | 35.586 | 3.135 | 3.931 | 6.665% |

TABLE 7

Fuel loss over time for Royal Oak ® Embers Briquettes

| Time (mins) | Mass 1 | Mass Fusel | Mass 2 | Mass Fusel | Mass 3 | Mass Fusel | Average Fusel | % Loss |
|---|---|---|---|---|---|---|---|---|
| initial | 32.526 |  | 31.107 |  | 32.258 |  |  |  |
| 4 | 38.834 | 6.308 | 37.550 | 6.443 | 39.410 | 7.152 | 6.634 |  |
| 6 | 38.803 | 6.277 | 37.529 | 6.422 | 39.382 | 7.124 | 6.608 | 0.402% |
| 8 | 38.792 | 6.266 | 37.525 | 6.418 | 39.376 | 7.118 | 6.601 | 0.507% |
| 10 | 38.760 | 6.234 | 37.495 | 6.388 | 39.326 | 7.068 | 6.563 | 1.070% |
| 15 | 38.688 | 6.162 | 37.425 | 6.318 | 39.274 | 7.016 | 6.499 | 2.045% |
| 20 | 38.616 | 6.090 | 37.366 | 6.259 | 39.216 | 6.958 | 6.436 | 2.995% |
| 25 | 38.589 | 6.063 | 37.330 | 6.223 | 39.172 | 6.914 | 6.400 | 3.532% |
| 30 | 38.558 | 6.032 | 37.278 | 6.171 | 39.139 | 6.881 | 6.361 | 4.115% |

TABLE 8

Fuel loss over time for Royal Oak ® Natural Briquettes

| Time (mins) | Mass 1 | Mass Fusel | Mass 2 | Mass Fusel | Mass 3 | Mass Fusel | Average Fusel | % Loss |
|---|---|---|---|---|---|---|---|---|
| initial | 21.147 |  | 20.558 |  | 20.857 |  |  |  |
| 2 | 25.199 | 4.052 | 24.851 | 4.293 | 24.251 | 3.394 | 3.913 |  |
| 3 | 25.202 | 4.055 | 24.838 | 4.280 | 24.248 | 3.391 | 3.909 | 0.111% |
| 4 | 25.188 | 4.041 | 24.827 | 4.269 | 24.231 | 3.374 | 3.895 | 0.469% |
| 5 | 25.176 | 4.029 | 24.794 | 4.236 | 24.220 | 3.363 | 3.876 | 0.946% |
| 10 | 25.121 | 3.974 | 24.755 | 4.197 | 24.175 | 3.318 | 3.830 | 2.130% |
| 15 | 25.091 | 3.944 | 24.729 | 4.171 | 24.112 | 3.255 | 3.790 | 3.143% |
| 20 | 25.046 | 3.899 | 24.682 | 4.124 | 24.061 | 3.204 | 3.742 | 4.362% |
| 25 | 24.995 | 3.848 | 24.627 | 4.069 | 24.024 | 3.167 | 3.695 | 5.580% |
| 30 | 24.948 | 3.801 | 24.596 | 4.038 | 23.982 | 3.125 | 3.655 | 6.602% |

Example 8

This example describes independent laboratory testing of an embodiment of a lighter fluid composition of the present disclosure having a 50/50 blend of fusel oil and methyl ester (biodiesel), also known as ESCOGO's EcoGreen™ product. This testing was done in compliance with South Coast Air Quality Management District (SCAQMD) has defined the Rule 1174 (incorporated by reference above). SCAQMD requires that an independent testing laboratory, approved by the District, conduct the testing and prepare a report of the findings. The report and a request for product certification must be submitted to the Executive Officer at SCAQMD. The testing must demonstrate to the satisfaction of the Executive Officer that VOC emissions resulting from the ignition of the barbecue charcoal are less than or equal to 0.020 pound per start before Rule 1174 product compliance certification approval is granted.

The EcoGreen™ product includes 50% fusel oil and 50% biodiesel. The fusel oil was provided by Archer Daniels Midland (ADM) and the biodiesel was a methyl ether biodiesel from soybean oil feedstock provided by Down to Earth Energy. Horizon Air Measurement Services, Inc. (Horizon) conducted a testing program in May 2017 to verify compliance of the EcoGreen™ product with respect to the Rule 1174. Testing was performed using the equipment and procedures detailed in "Rule 1174 Ignition Method Compliance Certification Protocol". As illustrated in the Test results provided in Table 9 below, the product the testing and was approved by SCAQMD and certification to Rule 1174 was granted to ESCOGO for the EcoGreen™ formula.

TABLE 9

SCAQMD RULE 1174 BARBECUE IGNITION
PRODUCT EMISSION TEST RESULTS.
Test prepared for: ESCOGO, LLC
Eco Green formulation:
Test Prepared by Horizon Air Measurement Services, Inc.
Horizon Report No S83-006-FR Table 2-2
Report Date Jul. 10, 2017
Test performed May 24, 2017

| | RUN NUMBER | | | |
|---|---|---|---|---|
| | 1 | 2 | 3 | Average |
| Stack Gas Characteristics | | | | |
| Temperature (° F.) | 83.7 | 90.3 | 84.3 | 86.1 |
| Flow Rate (dscfm) | 229 | 236 | 233 | 833 |
| VOC Emissions | | | | |
| Concentration (ppm) | 90.7 | 78.5 | 83.6. | 84..3 |
| Emission Rate (lb VOC/Start) | 0.0192 | 0.017 | 0.018 | 0.0181 |

The invention claimed is:

1. A charcoal briquette comprising: a charcoal briquette infused with a flammable composition, the flammable composition consisting essentially of: one or more dehydration products of fusel oil, wherein the one or more dehydration products of fusel oil are a multicomponent alcohol mixture.

2. The charcoal briquette of claim 1, wherein the one or more dehydration products of fusel oil is a byproduct of alcohol production from fermentation.

3. The charcoal briquette of claim 1, wherein the one or more dehydration products of fusel oil comprises 15% by volume or less of water.

4. The charcoal briquette of claim 1, wherein the dehydration products of fusel oil comprise one or more distillation fractions from distillation of fusel oil, and wherein the one or more distillation fractions are selected from the group consisting of: distillation fraction A obtained between room temperature and about 105° C., distillation fraction B obtained between about 106° C. and 133° C., distillation fraction C obtained at about 133° C. and above, and a combination thereof.

5. The charcoal briquette of claim 4, wherein distillation fraction A comprises a multicomponent alcohol mixture comprising two or more alcohols selected from the group consisting of ethanol, propanol, and water; wherein distillation fraction B comprises a multicomponent alcohol mixture comprising two or more alcohols selected from the group consisting of butanols and amyl alcohols; and wherein distillation fraction C comprises a multicomponent alcohol mixture comprising two or more alcohols selected from the group consisting of amyl alcohols, hexanols, and octanols.

6. The charcoal briquette of claim 1 wherein the one or more dehydration products of fusel oil is produced using mechanical filtration dehydration using molecular sieve membrane systems and wherein the dehydration product of fusel oil comprises less than about 15% by volume water.

7. The charcoal briquette of claim 1 wherein the one or more dehydration products of fusel oil is produced using a chemical dehydration method and wherein the dehydration product of fusel oil comprises less than about 15% by volume water.

8. The charcoal briquette of claim 1, wherein the flammable composition comprises about 5-100% by volume of the one or more dehydration products of fusel oil.

9. A charcoal briquette infused with a flammable composition, the flammable composition comprising:
one or more dehydration products of fusel oil, wherein the one or more dehydration products of fusel oil are a multicomponent alcohol mixture, and
a biodiesel component comprising a combination of fatty-acid alkyl esters (FAAEs).

10. The charcoal briquette of claim 9, wherein the biodiesel component is derived from a non-petroleum lipid source.

11. The charcoal briquette of claim 9, wherein the non-petroleum lipid source is selected from the group consisting of: animal fats, virgin vegetable oils, used cooking oil, brown grease, and combinations thereof.

12. The charcoal briquette of claim 9, wherein the one or more dehydration products of fusel oil make up about 5-99% by volume of the flammable composition and the biodiesel component makes up about 1-95% by volume of the flammable composition.

13. The charcoal briquette of claim 1, wherein the flammable composition has a flash point of about 38° C. or greater.

14. The charcoal briquette of claim 9, wherein the flammable composition consists of:
the one or more dehydration products of fusel oil at about 5-99% by volume of the flammable composition, wherein the one or more dehydration products of fusel oil have about 15% by volume or less of water; and
a biodiesel component at about 1-95% by volume of the flammable composition, wherein the biodiesel component consists of a combination of fatty-acid alkyl esters (FAAEs).

* * * * *